United States Patent [19]
Kotone et al.

[11] 3,873,563
[45] Mar. 25, 1975

[54] METHOD FOR MANUFACTURING 4-AMINO-1,2,4-TRIAZOLES

[75] Inventors: Akira Kotone, Nara; Masahiro Hoda; Takeshi Hori, both of Sakai; Yoshihiko Nakane, Neyagawa, all of Japan

[73] Assignee: Sakai Chemical Industry Company Limited, Osaka, Japan

[22] Filed: Sept. 29, 1972

[21] Appl. No.: 293,546

[52] U.S. Cl... 260/308 R, 260/294.8 G, 260/295 H, 260/295 AM, 260/295.5 H, 260/295.5 A, 260/296 R
[51] Int. Cl............................................. C07d 55/06
[58] Field of Search ................................ 260/308 R

[56] References Cited
OTHER PUBLICATIONS
Elderfield, "Heterocyclic Compounds," Vol. 7, p. 432, (Wiley), (1961).

Primary Examiner—Henry R. Jiles
Assistant Examiner—Robert T. Bond
Attorney, Agent, or Firm—Armstrong, Nikaido & Wegner

[57] ABSTRACT

In manufacturing 4-amino-1,2,4-triazole and a derivative thereof, a method which comprises reacting a nitrile with hydrazine in the presence of at least one of sulfur, hydrogensulfide and a compound capable of liberating hydrogensulfide under the reaction conditions to produce 4-amino-1,2,4-triazole or a derivative thereof and separating the product from the resultant reaction mixture.

17 Claims, No Drawings

METHOD FOR MANUFACTURING 4-AMINO-1,2,4-TRIAZOLES

This invention relates to a process for manufacturing 4-amino-1,2,4-triazole and derivatives thereof, more particularly to an improved method for manufacturing 4-amino-1,2,4,-triazole and derivatives thereof by reacting aromatic or aliphatic nitriles with hydrazine.

As well known in the art, 4-amino-1,2,4-triazole and derivatives thereof are chemically and thermally stable compounds and have been used in various fields. For example, they are used as starting materials for producing dyes, medicines, plastics etc. and also employed as corrosion inhibitors, additives to resins as they are.

The reactions between nitriles and hydrazine to produce triazoles are known in the art and various methods utilizing such reactions have been suggested. However, successful method of producing triazoles on a commercial scale has never been proposed yet. According to one of the known methods, for instance, aromatic triazoles are prepared by reacting aromatic nitriles such as benzonitrile with hydrazine hydrate, but the yield of the desired product is as low as less than 35% even when the reaction is conducted for a prolonged period of 64 hours. Though the yield will increase when anhydrous hydrazine which is higher in reactivity then hydrazine hydrate is used in place of the latter, it reaches only about 40% or less. Moreover, almost no report has been made as to the production of aliphatic triazoles through the reaction of aliphatic nitriles with hydrazine due to poor reactivity of the former.

Other methods in which corboxylic acids, acid amides, hydrazides or like are used as a starting material to produce triazoles are also known in the art. According to those methods, however, highly elevated temperatures and pressures are necessary and in spite thereof yield and purity of the products are still insufficient.

A main object of the invention is to provide a method of manufacturing 4-amino-1,2,4-triazole and derivatives thereof having a high purity in a high order of yield by reacting nitriles with hydrazine under mild reaction conditions.

According to the present method 4-amino-1,2,4-triazoles having the following formula (I) can be prepared:

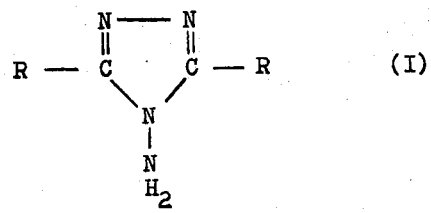

(I)

wherein R is (1) hydrogen, (2) a saturated or unsaturated aliphatic hydrocarbon group having 1 to 17 carbon atoms, (3) an alicyclic group, (4) a noncondensed aromatic group having 6 to 18 carbon atoms, (5) a condensed aromatic group having 10 to 14 carbon atoms, (6) a 5 or 6 membered heterocyclic ring, said saturated or unsaturated aliphatic hydrocarbon group having or not having at least one of substituents selected from the group consisting of —OH, —N($R^1$)$_2$, —NO$_2$, —COOH, —CHO, —CONHNH$_2$, —NHCOR$^2$, —OR$^2$, —SH and —SR$^2$, $R^1$ being hydrogen, an alkyl having 1 to 18 carbon atoms or an aryl, and $R^2$ being an alkyl having 1 to 18 carbon atoms, or an aryl, said (3) alicyclic group, (4) noncondensed aromatic group, (5) condensed aromatic group and (6) 5 or 6 membered heterocyclic ring containing or not containing at least one of substituents selected from the group consisting of a halogen, an alkyl of 1 to 18 corbon atoms, —OH, —NH$_2$, —N($R^1$)$_2$, —NO$_2$, —COOH, —CHO, —CONHNH$_2$, —NHCOR$^2$, —OR$^2$, —SH, —SR$^2$ and —SO$_3$H, $R^1$ and $R^2$ being the same as defined above.

The method of the present invention to produce the above 4-amino-1,2,4-triazoles comprises reacting a nitrile having the formula of $$RCN \qquad (II)$$

wherein R is the same as defined before, with hydrazine in the presence of at least one of sulfur, hydrogen sulfide and sulfur-containing compounds capable of liberating hydrogensulfide under the reaction conditions.

According to the researches of the present inventors it has been found that sulfur, hydrogen sulfied or a sulfur-containing compound which liberates hydrogen sulfide under reaction conditions exhibits a high order of catalytic activity in the reaction between a nitrile and hydrazine to produce a triazole, making it possible to obtain the triazole in a high yield within a short period of reaction time under mild reaction conditions.

In the present invention it is essential to employ sulfur, hydrogen sulfide or sulfur-containing compound which liberates hydrogen sulfide under reaction conditions as a catalyst. Representative examples of the sulfur-containing compounds which liberate hydrogen sulfide under reaction conditions are, for example, (1) metal sulfides such as sodium hydrogensulfide, potassium hydrogensulfide, calcium hydrogensulfide, sodium sulfide, potassium sulfide, iron sulfide, lead sulfide, copper sulfide, zinc sulfide, etc.; (2) polysulfides of the metals disclosed in (1) above; (3) aliphatic mercaptans such as methyl mercaptan, ethyl mercaptan, propyl mercaptan, isopropyl mercaptan, butyl mercaptan, dodecyl mercaptan, etc.; (4) aromatic mercaptans such as benzyl mercaptan, totyl mercaptan, thiophenol, mercaptonaphthol, mercaptophenol, etc.; (5) mercaptoalkanols such as mercaptoethanol, etc.; (6) mercaptoacids such as mercaptoacetic acid, mercaptobenzoic acid, thiosalicylic acid, etc.; (7) aliphatic polysulfides such as dimethyldisulfide, diethyl disulfide, dipropyl disulfide, etc.; (8) aromatic disulfides such as diphenyl disulfide, ditolyl disulfide, etc.; (9) amine salts of hydrogensulfide such as ammonium hydrogensulfide, ethylamine hydrogensulfide, diethylamine hydrogensulfide, triethylamine hydrogensulfide, n-proplamine hydrogensulfide, n-butylamine hydrogensulfide, n-pentylamine hydrogensulfide, cyclohexylamine hydrogensulfide, n-heptylamine hydrogensulfide, n-octylamine hydrogensulfide, 2-hydroxyethylamine hydrogensulfide, benzylamine hydrogensulfide, aniline hydrogensulfide, methylaniline hydrogensulfide, 2-methylimidazoline hydrogensulfide, piperidine hydrogensulfide, etc.; (10) hydrogen-polysulfides such as triethylamine hydrogenpolysulfide, n-nonylamine hydrogenpolysulfide, trimethlamine hydrogenpolysulfide, n-propylamine hydrogenpolysulfide, di-n-propylamine hydrogenpolysulfide, n-hexylamine hydrogenpolysulfide n-heptylaimine hydrogenpolysulfide, n-octylamine hydrogenpolysulfide, cyclohexylamine hydrogenpolysulfide, pyperidine hydrogenpolysulfide, etc.; and (11) thioamides such as acetothioamide, benzothioamide, etc. Of the above sulfur, hydrogen sulfide and sulfur-containing compounds capable of producing hydrogen sulfide under reaction conditions (hereinafter those compounds being referred to as "sulfur and its compounds"), particularly preferable are sulfur itself, hydrogensulfide, mercaptoalkanols and aromatic mercaptans. Most preferably are sulfur, hydrogensulfide, mercaptoethanol and tolylmercaptan. Sulfur and its compounds can be used singly or in admixture with one another. Particularly, when sulfur and mercaptoethanol are used in combination, higher catalytic activity will be ensured, so that such combination is most preferable in the invention. The sulfur and its compound can be employed in a wide range of amounts. The minimum amount thereof is usually 0.01 gram atom in terms of sulfur per mole of the nitrile used. Excessive amount can be used without any adverse effect. Particularly, mercaptoethanol serves not only as catalyst but also as solvent, when used in highly excessive amount. Generally catalytic effect of the sulfur and its compounds can be ensured when used in an amount of at least 0.01 gram atom, preferably 0.1 to 1.0 gram atom, in terms of sulfur per mole of the starting nitrile.

The starting nitriles to be used in the invention are those having the formula (II) disclosed before. Typical examples thereof are (1) hydrogen cyanide; (2) aliphatic nitriles such as acetonitrile, propionitrile, butylonitrile, isobutylonitrile, caproic nitrile, caprylonitrile, capric nitrile, lauric acid nitrile, stearic acid nitrile, ethylene cyanohydrin, aminopropionitrile, methylaminopropionitrile, ethylaminopropionitrile, propylaminopropionitrile, butylaminopropionitrile, pentylaminopropionitrile, hexylaminopropionitrile, heptylaminopropionitrile, dodecylaminopropionitrile, laurylaminopropionitrile, stearylaminopropionitrile, dimethylaminopropionitrile diethylaminopropionitrile, dipropylaminopropionitrile, cyanoacetic acid, cyanopropionic acid, cyanobutylic acid, methoxypropionitrile, ethoxypropionitrile, propoxypropionitrile, butoxypropionitrile, pentyloxypropionitrile, hexyloxypropionitrile, dodecyloxypropionitrile, lauryloxypropionitrile, stearyloxypropionitrile, mercaptopropionitrile, methylthiopropionitrile, ethylthiopropionitrile, propylthiopropionitrile, butylthiopropionitrile, pentylthiopropionitrile, hexylthiopropionitrile, heptylthiopropionitrile, dodecylthiopropionitrile, laurylthiopropionitrile, stearylthipropionitrile, etc.; (3) alicyclic nitriles such as cyclopropylcyanide, cyclobutyl cyanide, cyclopentyl cyanide, cyclohexyl cyanide, etc.; (4) noncondensed aromatic nitriles such as benzonitrile, chlorobenzonitrile, bromobenzonitrile, hydroxybenzonitrile, amionbenzonitrile, N,N-dimethylaminobenzonitrile, N,N-diethylaminobenzonitrile, N,N-dipropylbenzonitrile, N,N-diphenylaminobenzonitrile, N,N-ditolylaminobenzonitrile, cyanobenzoic acid, cyanobenzaldehyde, tolunitrile, methoxybenzonitrile, ethoxybenzonitrile, propoxybenzonitrile, butoxybenzonitrile, mercaptobenzonitrile, methylthiobenzonitrile, ethylthiobenzonitrile, propylthiobenzonitrile, buthylthiobenzonitrile, cyanobenzene sulfonic acid, phenyloxypropionitrile, tolyloxypropionitrile, phenylaminopropionitrile, tolylaminopropionitrile, phenylthiopropionitrile, tolylthiopropionitrile, benzylcyanide, etc.; (5) condensed aromatic nitriles such as cycanonaphthalene, cyanonaphthoic acid, (6) 5 or 6 membered heterocylic nitriles such as picolinic acid nitrile, nicotinic acid nitrile, isonicotinic acid nitrile, etc.

Hydrazine is preferably used in the invention in the form of aqueous solution of hydrazine hydrate, though anhydrous hydrazine is employable. The amount of hydrazine to be used is preferably equimolar to nitriles, but it is employable in an excessive amount.

According to the method of this invention, nitriles and hydrozines are reacted in the presence of the above catalysts, i.e., sulfur or its compounds. In carrying out the reaction it is preferable that the catalyst be placed in the reaction system in the form of a uniform mixture with hydrazine at the initial stage of the reaction. The reaction is preferably conducted in the presence of solvents, though it proceeds in the absence thereof. Employable are water-soluble solvents such as dioxane, dimethyl formamide, mercaptoethanol, ethanol, etc. Particularly, mercaptoethanol is preferable solvent, since it serves also as catalyst as disclosed before.

The reaction is preferably conducted with stirring at atmospheric or increased pressure. The reaction temperature can very over a wide range but is usually in the range of 40° to 250°C. Reaction temperature varies in accordance with the kind of starting materials. For example, suitable reaction temperature is 70° to 150°C for aliphatic nitriles and 120° to 200°C for aromatic nitriles. The reaction usually completes within a short period of 0.5 to 4 hours, though the reaction period varies depending on the reaction conditions applied, for example, kind and amount of nitriles used, kind and amount of catalysts used, reaction temperature, etc.

The aminotriazoles thus produced can easily be separated from the reaction mixture by conventional methods, for example, by condensation, followed by distillation under reduced pressure or recrystallization. Thus the product having a high purity can be obtained in a high yield of more than 60%, usually more than 80%.

For a better understanding of the invention examples are given below.

EXAMPLE 1

A mixture of 6.9 g of acetonitrile, 10 g of 84 wt.% hydrazine hydrate, 6.6 g of mercaptoethanol and 20 ml of ethanol was refluxed at 80 to 81°C for 3.5 hours. The resultant reaction mixture was condensed on a water bath under reduced presssure, whereby 9.0 g of 4-amino-3,5-dimethyl-1,2,4-triazole was obtained in the form of white crystalline solid having a melting point of 197° to 198°C. The yield was 95.8%.

EXAMPLE 2

A mixture of 6.9 g of acetonitrile, 20 g of 84 wt.% hydrazine hydrate, 2.0 g of triethylamine hydrogenpolysulfide and 20 ml of ethyleneglycol monomethylether was refluxed at 90° to 95°C for 4 hours. The resultants reaction mixture was condensed on a water bath under reduced pressure, and the recrystallization of the condensate from ethanol gave 7.5 g of 4-amino-3,5-dimethyl-1,2,4-triazole in the form of white crystalline solid having a melting point of 197° to 198°C. The yield was 79.7%.

EXAMPLE 3

A mixture of 6.9 g of acetonitrile, 20 g of 84 wt.% hydrazine hydrate, 6.8 g of triethylamine hydrogensulfide and 20 ml of ethanol was refluxed at 75° to 80°C for 3 hours. The resultant reaction mixture was condensed on a water bath under reduced pressure, and the recrystallization of the condensate from ethanol gave 7.8 g of 4-amino-3,5-dimethyl-1,2,4-triazole in the form of white crystalline solid having a melting point of 297° to 198°C. The yield was 83.0%.

EXAMPLE 4

A mixture of 5.5 g of propionitrile, 12 g of 84 wt.% hydrazine hydrate, 0.2 g of sulfur and 20 ml of dimethylformamide was refluxed at 79° to 85°C for 4 hours. The resultant reaction mixtutre was condensed on a water bath under reduced pressure, whereby 6.2 g of 4-amino-3,5-diethyl-1,2,4-triazole was obtained in the form of white crystalline solid having a melting point of 160° to 165°C. The yield was 88.6%.

EXAMPLE 5

A mixture of 9 g of lauric acid nitrile, 6 g of 84 wt.% hydrazine hydrate, 0.1 g of sulfur and 50 ml of mercaptoethanol was refluxed at 115° to 117°C for 3.5 hours. The resultant reaction mixture was condensed on a water bath under reduced pressure, and the recrystallization of the condensate from ethanol gave 6.1 g of 4-amino-3,5-diundecyl-1,2,4-triazole in the form of white crystalline solid having a melting point of 135° to 140°C. The yield was 63.9%.

EXAMPLE 6

A mixture of 6.7 g of stearic acid nitrile, 3 g of 84 wt.% hydrazine hydrate and 50 ml of mercaptoethanol was refluxed at 119° 122°C for 4 hours. The resultant reaction mixture was condensed on a water bath under reduced pressure, and the recrystallization of the condensate from ethanol gave 6 g of 4-amino-3,5-diheptadecyl-1,2,4-triazole in the form of white crystalline solid having a melting point of 111° to 112°C. The yield was 84.8%.

EXAMPLE 7

A mixture of 7.1g of ethylene cyanohydrin, 12 g of 84 wt.% hydrazine hydrate, 7.5 g of sodium sulfide monohydrate, 1.6 g of sulfur and 20 ml of ethanol was refluxed at 80° to 85°C for 4 hours. The resultant reaction mixture was condensed on a water bath under reduced pressure, and the recrystallization of the condensated from ethanol gave 5.5 g of 4-amino-3,5-bis($\beta$-hydroxyethyl)-1,2,4-triazole in the form of white crystalline solid having a melting point of 145° to 146°C. The yield was 69%.

EXAMPLE 8

A mixture of 8.5 g of acetone cyanohydrin, 12 g of 84 wt.% hydrazine hydrate, 4.6 g of mercaptoethanol and 20 ml of ethanol was refluxed at 77° to 84°C for 3 hours. The resultant reaction mixture was condensed on a water bath under reduced pressure to obtain oily substance. The oily substance was made acidic with hydrochloric acid and further condensated under reduced pressure. The recrystallization of the condensate from ethanol gave 8.9 g of 4-amino-3,5-bis($\alpha$-hydroxyisopropyl)-1,2,4-triazole hydrochloride having a melting point of 197° to 198°C. The yield was 75.4%.

EXAMPLE 9

Dried hydrogensulfide was bubbled at 25°C into a mixed solution of 12 g of 84 wt.% hydrazine hydrate and 20 ml of methanol to produce the solution saturated with hydrogensulfide. Thereafter 7.0 g of $\beta$-aminopropionitrile was added to the solution and the mixture was heated at 70° to 75°C for 4 hours. The resultant reaction mixture was condensed under reduce pressure, whereby 7.8 g of 4-amino-3,5-bis($\beta$-aminoethyl)-1,2,4-triazole was obtained in the form of strongly basic oily substance, yellow in color. The yield was 96%. Oxalic acid salt of the product had a melting point of 181° to 182°C.

EXAMPLE 10

A mixture of 200 g of mercaptoethanol, 150 g of benzonitrile and 180 g of 84 wt.% hydrazine hydrate was heated with stirring at 100°C for 15 minutes. To the mixture was further added 100 g of dimethylformamide and the resultant mixture was heated at 150°C while vaporized substances were distilled off. The heating was continued with stirring at that temperature for 2 hours. The recrystallization of the resultant product from methanol-benzene mixture gave 161 g of 4-amino-3,5-diphenyl-1,2,4-triazole in the form of colorless crystalline solid having a melting point of 263°C. The yield was 94%.

EXAMPLE 11

A mixture of 150 g of benzonitrile, 180 g of 85 wt.% hydrazine hydrate, 124 g of tolylmercaptan and 400 g of dimethylformamide was heated with stirring at 100°C for 20 minutes and then at 150°C for 2 hours, while vaporized substances were distilled off. The recrystallization of the resultant product from methanol-benzene mixture gave 153 g of 4-amino-3,5-diphenyl-1,2,4-triazole in the form of colorless crystalline solid having a melting point of 263°C. The yield was 89%.

EXAMPLE 12

A mixture of 150 g of benzonitrile, 180 g of 85 wt.% hydrazine hydrate, 46 g of thioglycolic acid and 400 g of dimethylformamide was heated with stirring at 100°C for 20 minutes and then at 150°C for 2 hours, while vaporized substances were distilled off. The recrystallization of the resultant product from methanol-benzene mixture gave 145 g of 4-amino-3,5-diphenyl-1,2,4-triazole in the form of colorless crystalline solid having a melting point of 263°C. The yield was 84%.

EXAMPLE 13

A mixtre of 150 g of benzonitrile, 180 g of 85 wt.% hydrazine hydrate, 4.7 g of sulfur and 200 g of mercaptoethanol was heated with stirring at 100°C for 15 minutes and then at 150°C for 2 hours, while vaporized substances were distilled off. The recrystallization of the resultant product from methanol-benzene mixture gave 163 g of 4-amino-3,5-diphenyl-1,2,4-triazole in the form of colorless crystalline solid having a melting point of 263°C. The yield was 95%.

EXAMPLE 14

A mixture of 10 g of phenylacetonitrile, 15 g of 85 wt.% hydrazine hydrate, 0.4 g of sulfur and 30 g of ethanol was heated with stirring at 120°C for 3 hours. The recrystallization of the resultant product from acetone gave 10.4 g of 4-amino-3,5-dibenzyl-1,2,4-triazole in the form of colorless crystalline solid having a melting point of 167°C. The yield was 92%.

EXAMPLE 15

A mixture of 10 g of phenylacetonitrile, 15 g of 85 wt.% hydrazine hydrate, 6.2 g of tolylmercaptan and 30 g of dimethylformamide was heated with stirring at 125°C for 3 hours. The recrystallization of the resultant product from acetone gave 9.9 g of 4-amino-3,5-dibenzyl-1,2,4-triazole in the form of colorless crystalline solid having a melting point of 167°C. The yield was 88%.

EXAMPLE 16

A mixture of 20 g of mercaptoethanol, 10.5 g of 4-chlorobenzonitrile and 18.0 g of 84 wt.% hydrazine hydrate was heated with stirring at 100°C for 15 minutes. To the mixture was further added 10 g of dimethylformamide and the resultant mixture was heated at 160°C while vaporized substances were distilled off. The heating was continued with stirring at that temperature for 2 hours. The recrystallization of the resultant product from methanol-benzene mixture gave 8.4 g of 4-amino-3,5-bis(4-chlorophenyl)-1,2,4-triazole in the form of colorless crystalline solid having a melting point of more than 290°C. The yield was 72%.

EXAMPLE 17

A mixture of 20 g of mercaptoethanol, 12.0 g of p-tolunitrile and 18.0 g of 84 wt.% hydrazine hydrate was heated with stirring at 100°C for 20 minutes. To the mixture was further added 10 g of dimethylformamide and the resultant mixture was heated at 160°C while vaporized substances were distilled off. The heating was continued with stirring at that temperature for 2 hours. The recrystallization of the resultant product from methanol gave 11.5 g of 4-amino-3,5-di-p-tolyl-1,2,4-triazole in the form of colorless crystalline solid having a melting point of 295°C. The yield was 85%.

EXAMPLE 18

A mixture of 30 g of mercaptoethanol, 10 g of m-aminobenzonitrile and 18.0 g of 84 wt.% hydrazine hydrate was heated with stirring at 125°C for 3 hours. The recrystallization of the resultant product from acetone gave 8.1 g of 4-amino-3,5-bis(3-minophenyl)-1,2,4-triazole in the form of colorless crystalline solid having a melting point of 241°C. The yield was 72%.

What we claim is;

1. In manufacturing a 4-amino-1,2,4-triazole having the formula

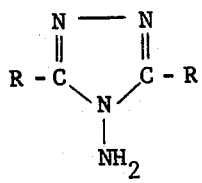

wherein R is (1) hydrogen, (2) a saturated or unsaturated aliphatic hydrocarbon group having 1 to 17 carbon atoms, (3) a cyclohexyl group, (4) a phenyl, (5) a naphthyl, (6) a pyridyl group, said saturated or unsaturated aliphatic hydrocarbon group being substituted by a member selected from the group consisting of —H, —OH, —N($R^1$)$_2$, —NO$_2$, —COOH, CHO, —CONHNH$_2$, —NHCOR$^2$, —OR$^2$, —SH and SR$^2$, R$^1$ being hydrogen, alkyl having 1 to 18 carbon atoms or phenyl, and R$^2$ being an alkyl having 1 to 18 carbon atoms or phenyl, said cyclohexyl group, phenyl group, naphthyl group and pyridyl group being substituted by a member selected from the group consisting of —H, a halogen, an alkyl of 1 to 18 carbon atoms, —OH, —N($R^1$)$_2$, —NO$_2$, —COOH, —CHO, —CONHNH$_2$, —NHCOR$^2$, —OR$^2$, —SH, SR$^2$ and —SO$_3$H, R$^1$ and R$^2$ being the same as defined above, a method which comprises treating hydrazine with a nitrile having the formula of

RCN wherein R is the same as defined above, in the presence of at least one of sulfur, hydrogensulfide and a compound capable of liberating hydrogensulfide under the reaction conditions to produce 4-amino-1,2,4-triazole having the above formula and separating the product from the resultant reaction mixture.

2. The method according to claim 1, in which said reaction is carried out in the presence of sulfur.

3. The method according to claim 1, in which said reaction is carried out in the presence of hydrogensulfide.

4. The method according to claim 1, in which said reaction is conducted in the presence of a compound capable of liberating hydrogensulfide under the reaction conditions.

5. The method according to claim 1, in which said compound capable of liberating hydrogen sulfide under the reaction conditions is one species selected from the group consisting of a metal sulfide, a metal polysulfide, an aliphatic mercaptan, an aromatic mercaptan, a mercaptoalkanol, a mercaptoacid, an aliphatic polysulfide, an aromatic disulfide, an amine salt of hydrogensulfide, a hydrogen-polysulfide and a thioamide.

6. The method according to claim 5, in which said compound capable of liberating hydrogen-sulfide under the reaction conditions is a metal sulfide selected from the group consisting of sodium hydrogensulfide, potassium hydrogensulfide, calcium hydrogensulfide, sodium sulfide, potassium sulfide, iron sulfide, lead sulfide, copper sulfide and zinc sulfide.

7. The method according to claim 5, in which said compound capable of liberating hydrogen-sulfide under the reaction conditions is a polysulfide of a metal selected from the group consisting of sodium, potassium, calcium, iron, lead, copper and zinc.

8. The method according to claim 5, in which said compound capable of liberating hydrogen-sulfide under the reaction conditions is an aliphatic mercaptan selected from the group consisting of methyl mercaptan, ethyl mercaptan, propyl mercaptan, isopropyl mercaptan, butyl mercaptan and dodecyl mercaptan.

9. The method according to claim 5, in which said compound capable of liberating hydrogen-sulfide under the reaction conditions is an aromatic mercaptan selected from the group consisting of benzyl mercaptan, tolyl mercaptan, thiophenol, mercaptonaphtol and mercaptophenol.

10. The method according to claim 5, in which said compound capable of liberating hydrogen-sulfide under the reaction conditions is mercaptoethanol.

11. The method according to claim 5, in which said compound capable of libertating hydrogen-sulfide under the reaction conditions is a mercaptoacid selected from the group consisting of mercaptoacetic acid, mercaptobenzoic acid and thiosalicylic acid.

12. The method according to claim 5, in which said compound capable of liberating hydrogen-sulfide under the reaction conditions is an aliphatic polysulfide selected from the group consisting of dimethyl disulfide, diethyl disulfide and dipropyl disulfide.

13. The method according to claim 5, in which said compound capable of liberating hydrogen-sulfide under the reaction conditions is an aromatic disulfide selected from the group consisting of diphenyl disulfide and ditolyl disulfide.

14. The method according to claim 5, in which said compound capable of liberating hydrogen-sulfide under the reaction conditions is an amine salt of hydrogensulfide selected from the group consisting of ethylamine hydrogensulfide, diethylamine hydrogensulfide, triethylamine hydrogensulfide, n-propylamine hydrogensulfide, n-butylamine hydrogensulfide, n-pentylamine hydrogensulfide, cyclohexylamine hydrogensulfide, n-heptylamine hydrogensulfide n-octylamine hydrogensulfide, 2-hydroxyethylamine hydrogensulfide, benzylamine hydrogensulfide, aniline hydrogensulfide, methylaniline hydrogensulfide, 2-methylimidazoline hydrogensulfide and piperidine hydrogensulfide.

15. The method according to claim 5, in which said compound capable of liberating hydrogen-sulfide under the reaction conditions is a hydrogen-polysulfide selected from the group consisting of triethylamine hydrogen-polysulfide, n-nonylamine hydrogen-polysulfide, trimethylamine hydrogenpolysulfide, n-propylamine hydrogen-polysulfide, di-n-propylamine hydrogen-polysulfide, n-hexylamine hydrogen-polysulfide, n-heptylamine hydrogen-polysulfide, n-octylamine hydrogen-polysulfide, cyclohexylamine hydrogen-polysulfide and piperidine hydrogen-polysulfide.

16. The method according to claim 5, in which said compound capable of liberating hydrogen-sulfide under the reaction conditions is a thioamide selected from the group consisting of acetothioamide and benzothioamide.

17. In process for producing a 4-amino-1,2,4-triazole having the formula

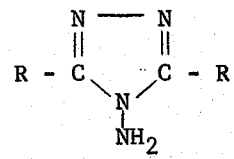

wherein R is:
hydrogen, a saturated or unsaturated aliphatic hydrocarbon group having 1 to 17 carbon atoms, a cyclohexyl group, a phenyl group, a naphthyl group, or a pyridyl group; said saturated or unsaturated aliphatic hydrocarbon group being substituted by a member selected from the group consisting of —H, —OH, —N(R$^1$)$_2$, —NO$_2$, —COOH, —CHO, —CONHNH$_2$, —NHCOR$^2$, —OR$^2$, —SH, and R$^2$, wherein R$^1$ is hydrogen or alkyl having 1 to 18 carbon atoms, and R$^2$ is an alkyl of 1 to 18 carbon atoms; said cyclohexyl, phenyl, naphthyl and pyridyl groups being substituted by a member selected from the group consisting of —H, a halogen, alkyl of 1 to 18 carbon atoms, —OH, —N(R$^1$)$_2$, —NO$_2$, —COOH —CHO, —CONHNH$_2$, —NHCOR$^2$, —OR$^2$, —SH, —SR$^2$ and —SO$_3$H where R$^1$ and R$^2$ having the meaning defined above;
the method which comprises treating hydrazine with a nitrile having the formula

RCN where R has the meaning defined above in the presence of a member selected from the group consisting of sulfur, hydrogen sulfide under reaction conditions to produce 4-amino-1,2,4-triazole having the above formula and separating the product from the resultant reaction mixture.

* * * * *